Sept. 14, 1926.                    1,599,443
J. VON WALDY
VEHICLE SUSPENSION
Filed April 5, 1924         2 Sheets-Sheet 1

Inventor
Julius Von Waldy

Sept. 14, 1926. 1,599,443
J. VON WALDY
VEHICLE SUSPENSION
Filed April 5, 1924 2 Sheets-Sheet 2
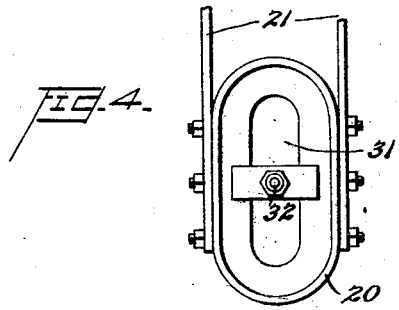
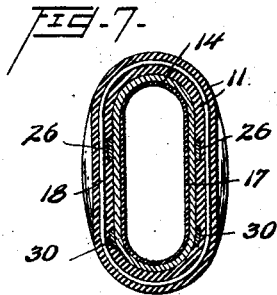
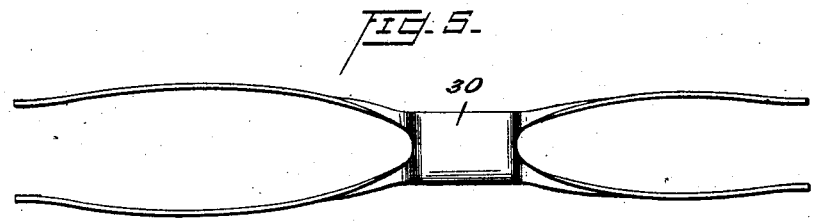
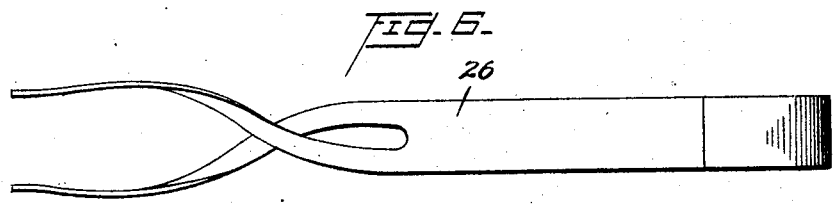
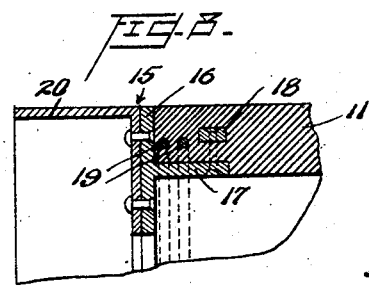
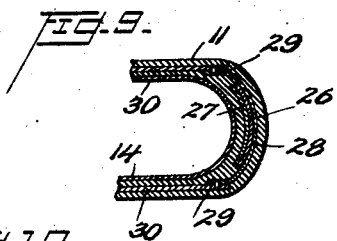
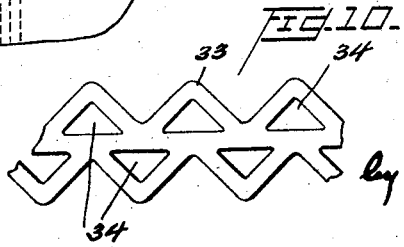
Inventor
Julius Von Waldy
his Attorneys Patented Sept. 14, 1926.

1,599,443

UNITED STATES PATENT OFFICE.

JULIUS VON WALDY, OF NEW YORK, N. Y.

VEHICLE SUSPENSION.

Application filed April 5, 1924. Serial No. 704,473.

My invention aims to provide an improved deformable suspension of the pneumatic type adapted to replace ordinary steel springs generally employed in motor vehicles and the like.

In the drawings, wherein I have shown one illustrative embodiment of my invention;

Fig. 4 is an end elevation of the device looking at the left end as shown in Fig. 1;

Figs. 5 and 6 are top plan views of reenforcing elements adapted to be applied to my improved spring cushion;

Figure 3:
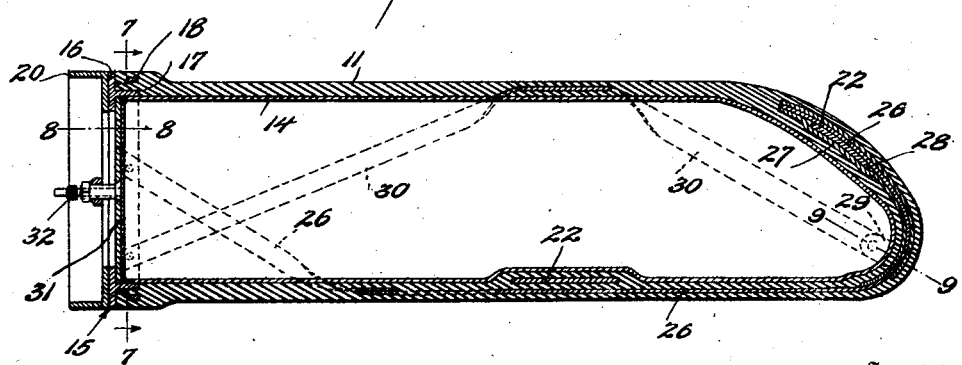
Fig. 3 is a central vertical sectional view of the device shown in Fig. 1.

Figs. 7, 8 and 9 are sectional views taken on the lines 7—7, 8—8 and 9—9, respectively of Fig. 3, and Fig. 10 is a fragmentary side elevation of a deformable cushion element adapted to be substituted for an element shown in the preferred form.

Referring to the drawings, my invention in the embodiment there shown comprises a reenforced, pneumatic spring suspension 11 attached at its ends to a chassis frame 12 and to the vehicle axles 13 in the same general manner as the well known semi-elliptical spring, whereby the cushion constitutes an elastic beam suspension and combines the characteristics of a steel spring and pneumatic shock absorber.

As best shown in Fig. 3 the pneumatic element 11 may comprise a fabric casing, conveniently molded in the desired shape, of flexible material, such for example, as vulcanized rubber or the like. One end of the casing, hereinafter for convenience designated as the front end, may be closed and the rear end may be open to receive an inflatable inner tube 14 or other resilient filler means. The open end of the casing is preferably connected to a rigid support 15 whereby it may conveniently be attached to the vehicle chassis frame. To this end, I have shown a T-shaped rim 16 having a flange 17, preferably embedded in and secured to the casing (see Figs. 3 and 8). In case the casing is made of molded material, a suitable ring 18 embracing the casing or embedded therein, may be secured to the flange 17 by riveting or otherwise, so that the rigid end of the casing will withstand the air pressure within without being blown off. Also, if desired, reenforcing rings or wires 19 may be embedded in the end of the casing between the ring 18 and the flanged rim 16. As shown in Figs. 3 and 8, a flange 20, conveniently an angle bar, may be secured to the rim 16 by riveting or otherwise to afford suitable means for securing the rigid end of the pneumatic element to the chassis. This flange may be rigidly connected to the chassis frame by means of a suitable shackle or fork 21 which may be secured in the opening ordinarily provided for one end of a semi-elliptical steel spring.

Figure 1:
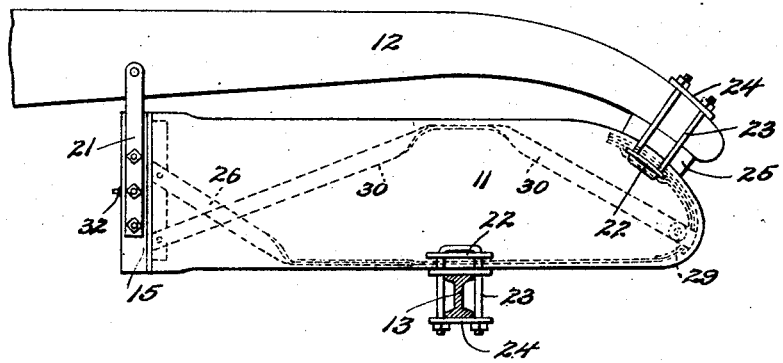
Fig. 1 is a side elevation of a preferred form of my improved spring applied to the frame of a motor vehicle.

To provide convenient means for securing the pneumatic element 21 at its front end to the chassis frame, and also to strengthen the casing, I have shown in Figs. 1 and 3 a suitable clamping plate 22 which may be embedded in the fabric, having openings at its outer ends to receive clamping bolts or the like, such as U-bolts 23, passing through a bridge plate 24 on the top of the chassis frame 12. As shown in Fig. 1, a spacing block or plate 25 may be interposed between the casing and the chassis frame. The bottom of the casing may also be secured to the axle 13 in the same manner.

The forward end of the pneumatic element is preferably reenforced by a series of spring leaves which may conveniently be embedded in the fabric (see Fig. 3). One spring leaf 26 preferably contacts with the plate 22 and is bent around the nose of the casing, extending rearwardly to a point past the axle where it is bifurcated or split, and the strips thus formed extend rearwardly and generally upwardly around the side walls of the casing to the flange 17 to which they are secured. These ends or strips are preferably shaped as shown in Fig. 6 so as to counteract any tendency to twist the casing or distort it laterally at the rear end due to lateral sway of the vehicle. Also, if desired, another spring leaf 27 is preferably embedded in the nose end of the casing below the spring leaf 26 and partially embraces the plate 22. As shown in Fig. 3 this spring leaf ends in the bottom wall of the casing near the front end and affords a brace or strengthening element therefor to absorb the shocks on the securing plate 22 and distribute the resulting stresses over the casing walls.

Figure 2:
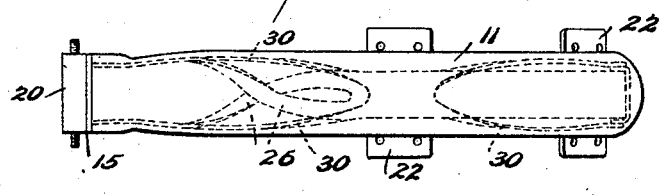
Fig. 2 is a top plan view of the spring cushion shown in Fig. 1.

On the opposite side of the spring leaf 26 another spring leaf 28 is preferably embedded in the casing, and this leaf, at the end of the nose, has suitable attaching devices such as the ears 29 adapted to provide means for securing reenforcing strips 30 which partially encircle the casing, and also may be embedded therein, extending from end to end as shown in Figs. 1, 2 and 3. These strips may be cut out of a single sheet of metal and bent to conform to the contour of the casing wall (see Fig. 5), that portion thereof at the top of the casing above the axle being shaped like a saddle so that the strips on the opposite side walls of the casing provide tension elements secured at their ends to prevent undue upward deflection thereof due to shocks and jars and to distribute the load over the casing walls. Obviously, these spring strips 30 may be arranged in any other convenient manner.

The open end of the casing is preferably non-circular, and conveniently oval as shown in Fig. 7, and the tube 14 may be inserted within the opening in the rigid flanges 16 and 20. A suitable closure plate 31 may be inserted in the opening and secured in place against the flange of the rim 16, conveniently by a tubular stud bolt and bridge plate. The valve stem 32 of the inner tube preferably passes through the opening in the stud bolt to provide access to the tube for inflating it.

Where the reenforcing spring strips cross each other and at the front end where the spring leaves are arranged in contacting relation, the casing walls may be thickened somewhat to prevent them from tearing out under stresses; also, the rear end of the casing may be much thicker than the other portions thereof to add to its strength where it is secured to the rigid end. If desired, the framework of reenforcing elements and the flange 16 may be tied in place on a core or the like before the casing is molded. The casing walls may be made of ordinary corded fabric, such for example, as that employed in automobile tires.

I have shown in Fig. 10 a modified filler 33 constructed of resilient material, such for example as molded rubber, having air pockets 34 so arranged and shaped as to distribute the load thereon throughout the length of the filler element. This filler is preferably shaped to conform to the shape of the inside of the casing and serves the same purpose as the inflatable tube. The pockets 34 are preferably so arranged as to provide a network of elastic webbing capable of being compressed to less than half of its normal size and of sufficient strength to maintain the normal shape of the casing under ordinary stresses. Such a filler may conveniently be employed in the suspension for heavy motor vehicles, such as large touring cars and motor trucks, for example.

My improved suspension device, reenforced as it is with tension elements, has the same general characteristics as a steel spring, and combines with it in the same structure the air cushioning effect of a pneumatic spring or shock absorber so that shocks and jars incident to running over deep ruts and obstacles may be absorbed more readily, and undue vibration of the chassis is eliminated. Also, because of the arrangement of the reenforcing elements, it is unnecessary to provide any vertical guide ways for the casing to prevent lateral play thereof.

Under load conditions the weight upon the chassis is transferred to the axle both through the leaf spring 26 and through the walls of the pneumatic cushion. The upward flexure of the bottom wall of the casing will tend to flex the upper wall thereof and place the reenforcing elements 30 under tension, thus causing the side walls of the casing to flex inwardly and permitting the upper wall to flex slightly, due to the straightening of the tension elements. However, this flexure will not be sufficient to cause the top of the casing to contact with the chassis frame. Upon the recoil of the spring, the bifurcated ends of the spring leaf 26 at the rear end are placed under tension, whereby undue flexure of the casing is avoided. These reenforcing or strengthening elements, when they are under tension, also press the side walls of the casing inwardly thereby permitting slight downward flexure at the rear end. Thus the recoil of the vehicle is absorbed by the leaf spring 26 and the casing walls.

Obviously, this pneumatic suspension may be substituted for a semi-elliptical spring either in the front or rear of motor and other vehicles of ordinary types, the only changes or modifications required being the provision of suitable brackets or supports for securing the ends of the casings to the chassis.

Obviously, my invention is not restricted to the specific embodiments therein shown and described, but is susceptible of various changes.

What I claim and desire to secure by Letters Patent is:

1. A deformable suspension for vehicles comprising, in combination, a flexible spring casing adapted to be connected at its ends to the vehicle chassis and intermediate its end to the vehicle running gear, said casing having bracing elements associated with its walls arranged to prevent lateral distortions thereof and to distribute the stresses.

2. A deformable spring suspension for motor vehicles and the like, comprising a pneumatic element presenting flexible walls, means for connecting said pneumatic element at two points to the vehicle frame and at one point to the running gear and means associated therewith to prevent lateral flexure under transverse strains.

3. A deformable suspension spring for vehicles comprising, in combination, a longitudinal, inflatable casing connected at its ends to the vehicle chassis frame and intermediate to its ends to the axle and a leaf spring reinforcement associated with a wall of the casing adapted to prevent lateral movement thereof and to carry a portion of the load.

4. A pneumatic spring suspension for vehicles comprising, in combination, an elongated inflatable casing connected at its ends to the vehicle body and intermediate its ends to the axle, and tension elements partly encircling said casing walls so arranged as to prevent lateral displacement under torsional stresses.

5. A pneumatic spring suspension for vehicles comprising, in combination, an elongated, inflatable casing connected at its ends to the vehicle body and intermediate its ends to the axle, and tension elements partly encircling said casing walls and embedded therein, said tension elements being so arranged as to prevent lateral displacement under torsional stresses.

6. A vehicle spring comprising an elongated, inflatable casing rigidly connected at its ends to the vehicle chassis frame and intermediate its ends to the vehicle axle and reinforcing means associated with said casing extending from end to end thereof adapted to carry a part of the load and prevent lateral displacement of the casing.

7. A vehicle spring comprising, in combination, an elongated, inflatable casing between the vehicle chassis frame and the axle, at least one end of the casing being connected to the chassis and spring reinforcing means for the casing also connected to the chassis and to the axle.

8. A vehicle spring comprising, in combination, an elongated, inflatable casing connected at its opposite ends to the vehicle chassis frame and intermediate its ends to the vehicle axle, one end connection for said casing comprising a rigid end support secured in one end of the casing, and means rigidly connecting said support to the chassis frame.

9. A vehicle spring comprising, in combination, an inflatable, tubular casing having a closed end and an open end, a rigid rim on said open end, means for connecting said rim and said closed end of the casing to the vehicle chassis frame, means for connecting the casing intermediate its ends to the vehicle axle, an inflatable inner tube insertible in the open end of said casing through said rim, a closure for said open end, and means associated with the casing to prevent lateral displacement thereof.

10. A vehicle spring comprising, in combination, an elongated inflatable, tubular casing connected at its ends to the vehicle chassis frame and intermediate its ends to the vehicle axle, a leaf spring imbedded in the casing wall and rigidly connected to the chassis frame and to the axle whereby to carry a part of the load.

11. A vehicle spring comprising, in combination, a tubular inflatable casing rigidly connected to the vehicle chassis frame at its ends, said casing being supported upon the vehicle axle, and spring reinforcing means extending from end to end of said casing and rigidly connected with respect to the chassis frame and also to the axle, said reinforcing means presenting branches conforming to the contour of the walls of the casing between the axle and one end thereof, whereby to prevent lateral flexure of the casing under distorting stresses.

12. A vehicle spring comprising, in combination, an elongated, inflatable casing connected at its ends to the vehicle chassis frame and mounted on the vehicle axle, spring means associated with the bottom of the casing and reinforcing means associated with the top and side walls of the casing, said spring means being so arranged as to permit substantial upward flexure of the bottom wall of the casing under load conditions and to prevent undue upward flexure of the upper wall of the casing and also to prevent lateral flexure due to torsional stresses.

13. A vehicle spring comprising, in combination, an elongated, inflatable casing connected at its ends to the vehicle chassis frame and between its ends to the axle, and reinforcing means imbedded in the walls of said casing and extending from end to end thereof, said reinforcing means being arranged in both the top and bottom walls of the casing extending for part of the length of the casing partially around the side walls thereof whereby to prevent lateral play due to distorting stresses.

14. A vehicle spring comprising, in combination, an elongated, inflatable casing having a flexible, curved end portion adapted to be connected to the vehicle chassis frame, said casing being mounted on the vehicle axle, a plurality of leaf springs imbedded in the curved end portion of the casing adapted to carry a part of the load and means for securing one of said springs rigidly to the chassis frame and to the axle.

15. A vehicle spring comprising, in combination, an elongated, inflatable casing having a flexible, curved end portion adapted to be connected to the vehicle chassis frame, said casing being mounted on the vehicle axle, a plurality of leaf springs imbedded in the curved end portion of the casing adapted to carry a part of the load and means for securing one of said springs rigidly to the chassis frame and to the axle, said means including securing plates imbedded in the walls of the casing and engaging one of said springs and clamping devices for said plates.

16. A vehicle spring comprising, in combination, an elongated, inflatable casing connected at its ends to the vehicle chassis frame and between its ends to the vehicle axle, said casing having a curved end wall, a leaf spring imbedded in said end wall, and also secured to the chassis, and reinforcing means imbedded in said casing and extending from end to end thereof partially around its walls, said reinforcing means being connected at one end to said leaf spring.

17. A pneumatic vehicle spring comprising, in combination, a flexible reinforced casing connected at its ends to the vehicle chassis frame and mounted between its ends on the axle, one end of said casing being open, a rigid end support secured in the casing, comprising a flanged rim having one flange extending longitudinally of the casing and imbedded therein, means for securing said flange to the casing, brackets for securing said end support rigidly to the chassis frame and a closure for the open end of the casing associated with said end support.

18. A deformable spring for vehicles comprising, in combination, an elongated, inflatable casing rigidly connected to the vehicle chassis frame and to the axle, a leaf spring reinforcing element extending from end to end of said casing and also rigidly connected with respect to the chassis frame at its ends, said spring being also secured between its ends to the axle and having crossed branches imbedded in the walls of the casing between the axle and chassis frame, the branches extending upwardly partially around the walls and adapted to permit upward flexure of the bottom wall of the casing and to resist recoil of the spring.

19. A spring for vehicles comprising the pneumatic casing 11 connected at its ends to the vehicle chassis frame and supported upon the axle, the rigid end 15 for the casing, and the reinforcing elements 26 and 30 imbedded in the casing walls and adapted to form a flexible beamlike suspension for the vehicle, all substantially as shown and described.

In testimony whereof, I have signed my name to this specification.

JULIUS VON WALDY.